United States Patent
Gupta et al.

(10) Patent No.: US 7,639,749 B2
(45) Date of Patent: Dec. 29, 2009

(54) SYSTEM AND METHOD FOR IMPROVING THE PERFORMANCE OF OFDM SYSTEMS

(75) Inventors: Parul Gupta, Jaipur (IN); Mohit Agarwal, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 568 days.

(21) Appl. No.: 11/301,069

(22) Filed: Dec. 12, 2005

(65) Prior Publication Data

US 2006/0222097 A1  Oct. 5, 2006

Related U.S. Application Data

(60) Provisional application No. 60/635,889, filed on Dec. 14, 2004.

(51) Int. Cl.
*H04L 27/28* (2006.01)
(52) U.S. Cl. ........................ 375/260
(58) Field of Classification Search .......... 375/260, 375/362, 325, 340, 346; 370/208, 343
See application file for complete search history.

(56) References Cited

U.S. PATENT DOCUMENTS

| 7,039,004 B2 * | 5/2006 | Sun et al. ............ 370/208 |
| 7,388,910 B2 * | 6/2008 | McKown ............ 375/232 |
| 2005/0084023 A1 * | 4/2005 | Bott et al. ............ 375/260 |

* cited by examiner

*Primary Examiner*—Khai Tran
(74) *Attorney, Agent, or Firm*—Prakash Nama; Global IP Services, PLLC (57) ABSTRACT

A method for improving the performance of OFDM (Orthogonal Frequency Division Multiplexing) systems addresses the channel estimation, equalization and decoding problems of conventional techniques and provides improved performance in a wide range of operating conditions that include varying Signal to Noise Ratio (SNR) levels, data rates, and fading channels. The method teaches SNR based selection in the use/choice of a smoothing filter. The invention further teaches using a smoothing filter in combination with Decision Feedback Equalization (DFE), using a smoothing filter in combination with WCSI (Weighted Channel State Information) decoding, which may be combined with DFE, and data rate based selection (for example, in IEEE 802.11a/g applications) in employing a decision feedback based correction.

15 Claims, 7 Drawing Sheets

SYSTEM AND METHOD FOR IMPROVING THE PERFORMANCE OF OFDM SYSTEMS

RELATED APPLICATION

Benefit is claimed under 35 U.S.C. 119(e) to U.S. Provisional Application Ser. No. 60/635,889, entitled "Robust Equalization and decoding Technique for OFDM Systems" by Parul Gupta et al, filed on Dec. 14, 2004, which is herein incorporated in its entirety by reference for all purposes.

TECHNICAL FIELD OF THE INVENTION

The present invention relates generally to communications systems such as OFDM (Orthogonal Frequency division multiplexing) systems and particularly for improving the performance of such systems by using improved equalization and decoding techniques.

BACKGROUND OF THE INVENTION

Frequency Division Multiplexing is used in a number of commercial wired and wireless applications, such as local-area network (LAN) products. It is a communications technique that divides a communications channel into a number of frequency bands. A sub-carrier carrying a portion of the user information is transmitted in each band. In OFDM (Orthogonal Frequency Division Multiplexing) systems, each sub-carrier is orthogonal with every other sub-carrier.

Typical commercial wireless applications include a transmitter with an antenna which transmits a signal through a channel where it undergoes reflection, absorption, attenuation, and takes multiple paths, as a result of which, the signal gets distorted when it reaches a receiver that is situated at a distance. OFDM systems are chosen for such applications because of their capability to operate in multi-path channels.

Considering one such OFDM system, the frequency domain representation of the data transmitted for the $k^{th}$ sub-carrier during the $n^{th}$ OFDM symbol of a frame is denoted as $X_n(k)$ and the received signal is denoted as $R_n(k)$. The channel distortion experienced by the $k^{th}$ sub-carrier is denoted as $H(k)$. It is assumed that the channel stays constant for the duration of the frame. In a simplified model, their relation can be expressed as $$Rn(k)=X_n(k)H(k)+W_n(k), \quad \text{Equation 1}$$

where $W_n(k)$ is the Additive Noise.

Channel estimation is a process followed for estimating the channel distortion on each sub-carrier. Usually, a known preamble sequence $X_p$ is transmitted along with the payload for the various estimation and synchronization functions. The channel estimate which is denoted by $\hat{H}$, can be derived as the ratio the received preamble $R_p(k)$ The channel estimate which is denoted by $\hat{H}$, is the ratio of the received preamble $R_p(k)$ to the transmitted preamble $X_p(k)$ and is given by $H(k)+\epsilon_h$ where $\epsilon_h$ is the error in channel estimation due to noise.

The above is expressed as $$\hat{H}(k) = \frac{R_p(k)}{X_p(k)} \quad \text{Equation 2}$$
$$= H(k) + \varepsilon_H(k)$$

In systems where more than one preamble is available, estimates can be averaged to reduce this error. For example, an IEEE 802.11a system has two identical Long Preamble sequences, which can be used for estimating the channel as follows:

$$\hat{H}(k) = \frac{1}{2}\left(\frac{R_{LP1}(k)+R_{LP2}(k)}{X_{LP}(k)}\right) \quad \text{Equation 3}$$
$$= H(k) + \frac{W_{LP1}(k)+W_{LP2}(k)}{2X_{LP}(k)}$$
$$= H(k) + \varepsilon_H(k)$$

If there were no noise, $\hat{H}$ would have been equal to H. For accuracy in determining the data, this error term needs to be minimized. A common method used to minimize this error is by using a smoothing filter. The smoothing filter averages over multiple, say N adjacent tones in the frequency domain. Thus, for a channel with fixed value of H, the H term remains constant while the noise terms are reduced on averaging. However, when H is different for different tones, as in the case of fading channels, the variation in H introduces a new error component. At high Signal to Noise Ratio (SNR) values, this error component may actually be larger than the original error due to noise. Thus, this method, which is commonly used, has its limitations when used in certain conditions.

Another method that is commonly used for improving the estimate of $\hat{H}$ is Decision Feedback Equalization (DFE). According to this method, $\hat{H}$ is initialized with an initial inaccurate estimate calculated from the preamble values to calculate the equalized symbol $R_{e,n}$, which has a noise component. This $R_{e,n}$ is passed through the demodulator and decoder. It is assumed that the demodulator and decoder are able to recover data without errors, and this can be used to find the originally transmitted $X_p$ by passing again through the transmit chain. This assumption is reasonable because, if the demodulator/decoder fails to correct the errors, the packet is already lost, and applying DFE for subsequent symbols will not help in recovering the packet. This is then fed back to the equalizer to compare with the received $R_{e,n}$ (which is stored) to compute a measure of error in the channel estimate. This error is subtracted from the future symbols. This process is repeated for each symbol in the packet. Thus the initial coarse estimate is iteratively improved. But there are major practical constraints in employing DFE under certain conditions, such as low data rates in IEEE 802.11a/g systems. Further, when used at low SNRs (high noise), a wrong error feedback through DFE, can even increase the possibility of packet error. So, the DFE under certain conditions can be limited or even detrimental.

Zero-forcing equalization in the presence of fading channels can lead to degradation due to noise enhancement. This degradation can be reduced by assigning a reliability metric or weight to each value that is fed to the decoder based on the corresponding value of $\hat{H}$. When $\hat{H}$ is small, the error term is high and hence the value that is sent to the decoder is less reliable. This method, which is known as WCSI (Weighted Channel State Information Decoding), when used separately has certain limitations due to limited accuracy of channel estimates; however when it is used in conjunction with the certain other elements as described herein, it provides significant advantages under various conditions.

Decision Feedback based channel tracking for channel estimation and equalization: Examples of prior art publications in this context include: 1) Hsuan-Yu Liu et. al., "Combining Adaptive smoothing and Decision-Directed Channel Estimation Schemes for OFDM-WLAN systems", in Proc.

Of ISCAS'2003, Bangkok Thailand, May 2003; 2) Sun et al, "Decision feedback channel estimation and pilot tracking for OFDM systems", U.S. Patent Application Publication No. 20040066773, Apr. 8, 2004.

The equalized symbols after Zero-forcing equalization are given by $$R_{e,n}(k) = \frac{R_n(k)}{\hat{H}(k)} \quad \text{Equation 4}$$

$$= \frac{X_n(k)H(k) + W_n(k)}{\hat{H}(k)}$$

$$= \frac{X_n(k) \cdot [\hat{H}(k) - \varepsilon_H(k)] + W_n(k)}{\hat{H}(k)}$$

Here, the constellation error, $\varepsilon_{X,n}(k)$ can be expressed as $$\varepsilon_{X,n}(k) = R_{e,n}(k) - X_n(k) \quad \text{Equation 5}$$

$$= \frac{-\varepsilon_H(k) \cdot X_n(k) + W_n(k)}{\hat{H}(k)}$$

This error $\varepsilon_{X,n}(k)$, can be used to estimate the Channel estimation error $\varepsilon_H(k)$ as follows:

$$\frac{1}{N}\sum_{n=1}^{N}\frac{\varepsilon_{X,n}(k)}{X_n(k)} = \frac{-\varepsilon_H(k)}{\hat{H}(k)} + \frac{1}{N \cdot \hat{H}(k)}\sum_{n=1}^{N}\frac{W_n(k)}{X_n(k)} \quad \text{Equation 6}$$

As N becomes larger, the noise sum becomes smaller due to averaging and, a progressively purer estimate of $\varepsilon_H(k)$ is obtained:

$$\frac{\varepsilon_H(k)}{\hat{H}(k)} \approx \left(1 - \frac{1}{N}\sum_{n=1}^{N}\frac{R_{e,n}(k)}{X_n(k)}\right) = 1 - r_{X,N}(k) \quad \text{Equation 7}$$

Estimates of $X_n(k)$, $\hat{X}_n(k)$, can be obtained by making nearest neighbor decisions on the equalized symbols, or, if there is forward error correction in the system, or by feeding back the decoder decisions through the transmit chain. The latter is clearly more accurate, as it can correct errors to give a better estimate of $X_n(k)$, but at the cost of complexity and delay.

Once the channel estimation error $\varepsilon_H(k)$ is known, the equalizer outputs can be refined as follows:

$$Y_n(k) = R_{e,n}(k) + \tilde{X}_n(k)\varepsilon_{H,n-1}(k)\hat{H}(k)^{-1} \quad \text{Equation 8}$$

$$= R_{e,n}(k) + \tilde{X}_n(k) \cdot (1 - r_{X,n-1}(k))$$

For the prediction of the current symbol $X_n(k)$, an approximation $\hat{X}_n(k) = R_{e,n}(k)$ is used. Another issue is that when $X_n(k)$ is small, the estimation can actually become worse because of noise enhancement in the term $R_{e,n}(k)/X_n(k)$. To prevent this, $r_X(k)$ is weighted to give smaller weights to contributions due to small $|X_n(k)|$ as shown below:

$$r_{X,n-1}(k) = \begin{cases} 1, & \text{if } n = 1 \\ (1-w)r_{X,n-2}(k) + \\ R_{e,n-1}(k)\hat{X}_{n-1}(k)^{-1}w, & \text{otherwise} \end{cases} \quad \text{Equation 9}$$

where $$w = \frac{|\hat{X}_{n-1}(k)|}{|X|_{max}(n-1)}$$

Using decision feedback equalization has some practical limitations. For example, for a finite Traceback Viterbi algorithm in an IEEE 802.11a/g system, there is latency between decoder inputs and outputs till enough bits are received to perform a traceback and get the decoded bits. These bits are then passed through the transmit chain and the modulated symbols thus achieved are compared with the received symbols, and the error vector is calculated. This causes additional delay and demands a lot of extra storage, especially at lower data rates.

Secondly, for lower data rates operating typically at lower SNRs, the initial DFE weight vectors will be very noisy and may cause a packet error. In such cases, the effect of using DFE may be limited or even detrimental. The implementation of data rate based DFE selection is beneficial in this context.

Weighted Channel State Information (WCSI) decoding for channel estimation and equalization:

This approach targets the component of error in the equalizer outputs $R_{e,n}(k)$ corresponding to $$\frac{W_n(k)}{\hat{H}(k)}$$

(also refer to equation 4 above). For channels in deep fades, when $|\hat{H}(k)|$ is very small, this term can become a significant cause of errors. To prevent this, a reliability-metric is associated with each of the bits being decoded by the Viterbi algorithm. This reliability metric is based on the channel experienced by the particular bit. The bits on the sub carriers, which are in a fade, have low reliability (as they are likely to have a large noise component) and hence should be given less weight in Viterbi decoding. The sub carriers with a stronger signal (large $|\hat{H}(k)|$) should be given large weights. In the absence of any weighting, the Viterbi metrics D(k)'s are calculated as follows:

$$D(k) = \sum_n |y_n - a_n(k)|^2 \quad \text{Equation 10}$$

where $\{y_n\}$ represents the coded input sequence to Viterbi and $\{a_n(k)\}$ is the transmit sequence associated with a particular path 'k' in the trellis.

Conventional techniques weigh the branch metric calculation with the channel estimates for each bit as below $$D'(k) = \sum_n \rho_n^2 |y_n - a_n(k)|^2 \quad \text{Equation 11}$$

where $\{\rho_n\}$ is the sequence of channel estimates experienced by $y_n$ and can be derived from $\hat{H}$. such method gives considerable improvement in performance under multipath conditions, but at the cost of higher complexity.

For reducing the computational complexity of WCSI decoding, the channel state information $\{\rho_n\}$ may be quantized to a small number of soft bits $N_{sb}(=1, 2, 3 \ldots)$. The method of erasures is a further simplification with $N_{sb}=1$, and is equivalent to choosing a weight of 0 or 1 based on a threshold. This completely eliminates the need for multiplying the branch metric with a weight; instead, a branch contributes to the metric only if the weight associated with it is 1, and not otherwise. The benefit in this approach is reduced compared to WCSI but is still significant compared to the un-weighted Viterbi approach.

Channel estimation, Equalization, or Decoding methods govern the performance of the system. Conventional methods that are used to carry out these steps suffer from drawbacks such as the inclusion of an error that may be larger than the original error that the method intended to correct under certain conditions, and practical constraints such as excessive memory and other hardware requirements for implementation. Even though the above-described approaches may be individually known, there is a need for using particular parameters for limiting the use of these approaches, and for providing modification to the above approaches for obtaining a unique advantage in determining the performance of these systems. An example of a related prior art publication is Sari, H.; Karain, G.; Jeanclaud, I., "Frequency Domain Equalization of mobile radio and terrestrial broadcast channels", Global Telecommunications Conference, GlobeComm, 1994.

SUMMARY OF THE INVENTION

The present invention aims to improve channel estimation, equalization and decoding operations to improve performance in known systems. Disclosed herein is a method of improving the performance of an OFDM system that offers advantages over known methods. The novel method taught herein addresses channel estimation, equalization and decoding problems of conventional techniques and provides improved performance in a wide range of operating conditions that include Signal to Noise Ratio, Data Rates, and fading channels. According to an aspect of the invention, there is provided a method for improving the performance of an OFDM system, comprising the steps of performing channel estimation on a received preamble to obtain a first estimate, using a smoothing filter on the first estimate to improve the channel estimate, performing equalization, demodulation and decoding on the received signal to obtain an estimate of the transmitted signal and performing a decision feedback based correction on the received signal.

According to another aspect of the present invention there is provided a method for improving the performance of an OFDM system, comprising the steps of performing channel estimation on a received preamble to obtain a first estimate and making a decision pertaining to the use or choice of a smoothing filter to improve the first channel estimate, wherein one of the parameters on which the decision is based is an estimated Signal to Noise Ratio.

According to another aspect of the present invention there is provided a method for improving the performance of an OFDM system, comprising the steps of performing channel estimation on a received preamble to obtain a first estimate and deciding whether to perform decision feedback based correction to improve the channel estimate, wherein the decision whether to perform decision feedback based correction is based on a comparison of the of the received data rate with a threshold value, as applied in the context of IEEE 802.11a/g systems.

According to yet another aspect of the present invention, there is provided a method for improving the performance of an OFDM system, comprising the steps of performing channel estimation on the preamble in a received signal to obtain a first estimate, using a smoothing filter to improve this first channel estimate, performing equalization, demodulation and decoding on the signal to obtain an estimate of the transmitted signal, performing a decision feedback based correction on the received signal, assigning a reliability weight to the demodulated symbols according to the channel estimate, and decoding them according to the assigned weight. According to further aspect of the invention, an article includes a storage medium having instructions that, when decoded by a computing platform, will result in a method for improving the performance of an OFDM (Orthogonal Frequency Division Multiplexing) system, including performing channel estimation on a preamble in a received signal to obtain a first estimate, using a smoothing filter on this first estimate to obtain an improved channel estimate, performing equalization, demodulation and decoding on the received signal to obtain an estimate of transmitted signal, and, performing a decision feedback based correction on the received signal. According to yet further aspect of the invention, an article includes a storage medium having instructions that, when decoded by a computing platform, will result in a method for improving the performance of an OFDM (Orthogonal Frequency Division Multiplexing) system, including performing channel estimation on a preamble in a received signal to obtain a first estimate, and making a decision pertaining to selective use/choice of a smoothing filter to improve the first estimate, wherein one parameter on which said decision is based comprises an estimated SNR. According to yet another aspect of the invention, an article includes a storage medium having instructions that, when decoded by a computing platform, will result in a method for improving the performance of an OFDM (Orthogonal Frequency Division Multiplexing) system, including performing channel estimation on a preamble in a received signal to obtain a first estimate, and deciding whether to perform decision feedback based correction to improve the channel estimate, wherein the decision whether to perform decision feedback based correction is based on a comparison of a data rate of the received signal with a threshold value in IEEE 802.11a/g applications.

BRIEF DESCRIPTION OF THE DRAWINGS

A more detailed understanding of the invention may be had from the following description of preferred embodiments, given by way of example only, and to be understood in conjunction with the accompanying drawings in which:

FIG. 2(*a*) is flowchart illustrating the implementation of a smoothing filter with decision feedback based correction according to an embodiment of the present subject matter;

FIG. 2(*b*) is flowchart illustrating the implementation of SNR based selection of smoothing filter with decision feedback based correction according to an embodiment of the present subject matter;

FIG. 3(*a*) is a flowchart illustrating the implementation of a smoothing filter with Weighted Channel State Information (WCSI) decoding according to an embodiment of the present subject matter;

DETAILED DESCRIPTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims and their equivalents.

The term "FFT" refers to Fast Fourier Transform, which is an efficient algorithm to compute the Discrete Fourier Transform (DFT) and its inverse. FFT takes a discrete signal in the time domain and transforms that signal into its discrete frequency domain representation. The term "SNR" refers to Signal to Noise Ratio, which is a measure of signal strength relative to background noise. The ratio is usually measured in decibels. The term "AWGN" refers to Additive White Gaussian Noise. Conventional techniques use smoothing filters for improving the channel estimate of OFDM systems. Here the initial channel estimate is passed through a smoothing filter, which results in an improved channel estimate due to averaging of noise across adjacent frequencies. However, for fast fading channels, especially for higher tap smoothing filters, the amount of error introduced due to the varying channels exceeds the noise compensation due to smoothing. So, in order to use the filter effectively, a decision needs to be made as to whether it is advantageous to pass the signal through a smoothing filter.

Two parameters on which this decision can be based are signal to noise ratio (SNR) and delay spread. Estimation of the delay spread may not be possible at all scenarios, especially when the number of known preamble sequences or equivalently the timeline available for this estimation is limited. Expediently, the invention proposes the use of SNR as a preferred parameter to make this decision and to choose an appropriate smoothing filter.

Figure 1:
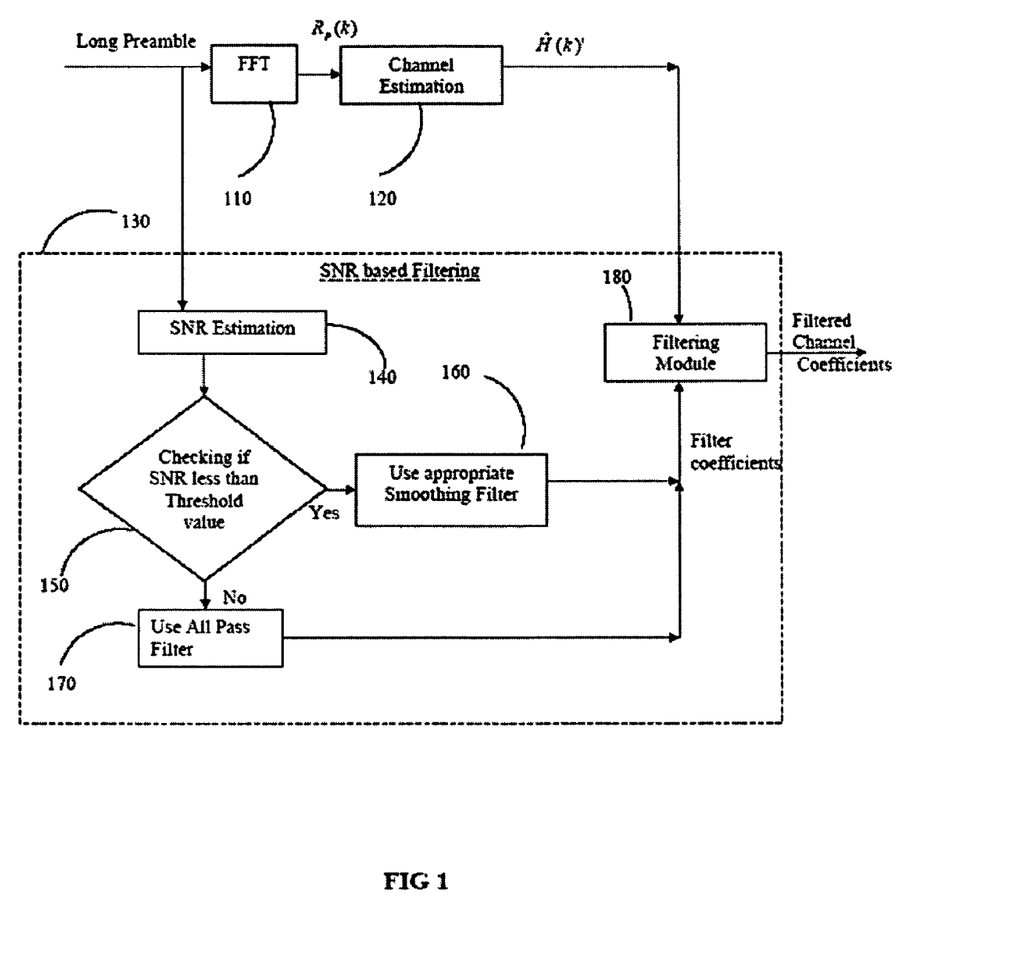
FIG. 1 is a flowchart illustrating the implementation of SNR based selection of a smoothing filter according to an embodiment of the present subject matter.

Referring to FIG. 1, at 110, FFT computation is performed on the received signal to convert the representation of the received signal from the time domain to the frequency domain. The received signal in frequency domain $R_n(k)$ obtained after performing the FFT computation includes the channel distortion $H(k)$ in addition to the transmitted signal $X_n(k)$ (Refer to the equations 1, 2 and 3 above). At 120, channel estimation is performed on the received preamble $R_p(k)$ to obtain an estimate of the channel $\hat{H}(k)'$. The channel estimate $\hat{H}(k)'$ thus obtained includes an error $\epsilon_H(k)'$ due to noise and various other impairments on the signal. This error $\epsilon_H(k)'$ is a ratio of the Additive Noise (W) and the transmitted preamble $X_p(k)$. At 130, SNR based filtering is carried out as a result of which a decision is made regarding the choice or use of a filter to minimize inaccuracies in the channel estimate. At 140, SNR estimation is performed on the received signal. At 150, the estimated SNR of the received signal is compared with a threshold value. If the estimated SNR of the received signal is less than the threshold value, then the block 160 chooses an appropriate smoothing filter and passes the filter coefficients to the filtering module at 180. In this case, the channel estimates obtained for the signal at different frequencies are averaged so as to obtain a better channel estimate. Otherwise, the signal is passed through an all pass filter chosen at 170, hence no smoothing (averaging) on the initial channel estimate. The coefficient of the smoothing filter to be employed for smoothing may also be based on the SNR estimate.

In a specific implementation, which performs better under all noise and channel conditions of interest in IEEE 802.11a/g systems, a 3-tap filter with coefficients [0.2741 0.45186 0.2741] and the second path as the prompt index is used below SNR=10 dB and an all pass filter is used for higher SNR values. In cases where the expected system operating conditions are known more accurately, the SNR threshold and the various filter coefficients can be chosen to provide a higher performance.

The filter, chosen according to the SNR estimate helps in obtaining an improved channel estimate by minimizing the error (noise factor) in the received signal. SNR based selection of smoothing filter is advantageous since it takes into account the SNR for the signal, and performs smoothing only on signals below the threshold value and ensures that the estimate after filtering is better than the first estimate after accounting for both the white noise as well as noise introduced due to filtering.

After passing the channel estimate through a smoothing filter or otherwise, equalization is performed on the signal to recover the transmitted data. A technique that is used to refine this equalized signal is the decision feed back equalization technique. Decision Feedback Equalization (DFE) is a conventional technique that is used to iteratively improve an initial coarse channel estimate to get a more accurate estimate of the transmitted signal. This involves performing several iterations depending on the number of symbols till an accurate estimate is finally obtained. Under certain conditions, DFE is effective in computing an accurate estimate and is feasible as well, whereas when it is employed under other conditions, it is less reliable, and more demanding in terms of hardware requirements. Under such conditions, not employing DFE would actually be a better option. Thus, a decision is required to be made whether to perform Decision Feedback Equalization. According to an embodiment of the invention used in IEEE 802.11a/g systems, this decision is made on the basis of a comparison of the data rate of the received signal with a predetermined threshold value.

Figure 2A:
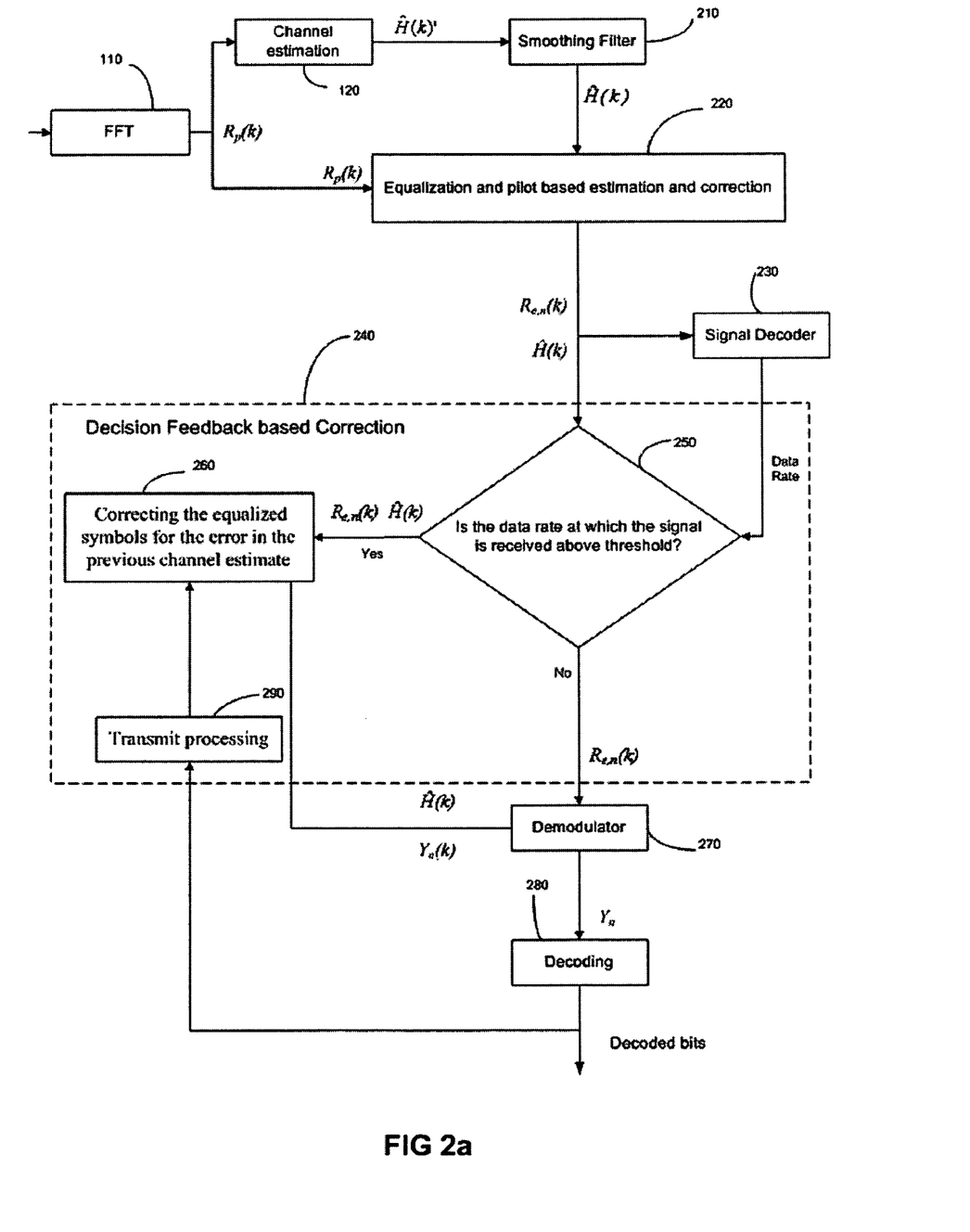

Now referring to FIG. 2(a), 240 is a conditional signal refinement block. At 250, the decoded data rate is checked against a threshold and a decision is made on whether to refine the signal using Decision Feedback Equalization. If the data rate of the signal is above the threshold value, Decision Feedback based correction is performed on the signal so as to refine the signal as shown at 260. FIG. 2 (a) illustrates a combination of using a smoothing filter to improve channel estimation and DFE to improve the equalization. However, DFE with data rate based selection can be implemented on a channel estimate independent of whether it is passed through a smoothing filter or not.

The channel estimate that is obtained after applying a smoothing filter is better than the normal channel estimate because of the reduction in the noise component by averaging. However, an extra noise component is added due to filtering, especially in highly frequency-selective fading channels. To compensate for this noise a method that performs decision feedback based correction on the channel estimate is proposed. According to an embodiment of the invention, after estimation of the channel for the received signal and improving the estimate by using a smoothing filter, equalization is performed on the signal to recover the transmitted data. Then the equalized signal is refined using the decision feed back equalization technique.

Thus, it is seen that when a smoothing filter is used for improving a channel estimate, some noise component may remain uncompensated. DFE is then employed to compensate for that noise, thereby providing a system that yields accurate estimates and performs well under a wide range of conditions. It is noted that even though in FIGS. 2a through 4a, the smoothing filter or the SNR based filter component is identified as 210, it is the equivalent of the filter component 130 shown in FIG. 1.

Referring further to FIG. 2(a), the channel estimate obtained as a result of the channel estimation at 120 on the received preamble is passed through a smoothing filter at 210. At step 220, equalization and pilot based estimation and correction is performed on the signal so as to obtain the originally transmitted signal. The outcome of the FFT computation performed at step 110, together with the channel estimate obtained as a result of application of smoothing filter at step 210 is used in the equalization and pilot based estimation of the signal. The outcome of equalization performed at 220 is the equalized signal $X_n(k)'$, noting that $\hat{H}_f(k)'$ is an input to the module which is passed along for further use by the DFE and decoder modules.

The equalized signal is then demodulated at 270. Further, if there are any forward error correction codes implemented in the system, there can be a decoder 280, to get the originally transmitted data stream. For example, in an IEEE 802.11a system, the decoder uses an algorithm such as the Finite Traceback Viterbi algorithm to perform decoding. The decoder corrects errors in the decoded bits and gives a data stream which is fed back again to the equalizer after doing the transmitter processing at 290 (including coding and modulation). Then a decision feedback based correction is performed in the above-described manner through 260.

A preferred embodiment of the invention involves a system of IEEE 802.11a standard that operates in a 5 GHz band (or in 2.4 GHz in the case of IEEE 802.11g standard), and uses a 52-subcarrier OFDM (Orthogonal Frequency Division Multiplexing). Such a system may support up to 8 data rates 6, 9, 12, 18, 24, 36, 48, and 54 Mbps. Lower data rates use smaller constellations like BPSK/QPSK and are more robust to noise. As a result, they can operate at lower SNRs as compared to higher data rates (such as 48 and 54 Mbps). Also, the lower data rates transmit fewer data bits per symbol, and hence for a finite trace back Viterbi algorithm with a specified trace back depth, the storage and delay costs incurred due to the transmit processing chain of DFE for lower data rates are larger than for higher data rates. So a threshold of the data rate is chosen, above which a decision feedback based correction is employed, and below which it is not, such that the memory requirements do not become excessive, and at the same time, the feedback scheme is also more effective.

Referring further to FIG. 2(a), if at step 250, the data rate of the signal is above threshold, the equalized symbols are refined at step 260 by compensating for the error in the channel estimate. An estimate of this error, $\epsilon_H(k)$ is formed by comparing the decision feedback symbols with the original equalized symbols. These refined equalized symbols are passed on to the demodulator 270 and decoder 280, and the process is repeated till the end of the packet. If the decoded data rate is below the threshold, DFE is not employed. The finally decoded data bit stream after refinement by the use of DFE as explained above contains less error and is more reliable.

The outcome of SNR based selection of smoothing filter is a channel estimate that is better compared to the conventional technique. One of the consequences of employing SNR based threshold for the choice of the smoothing filter is that for higher order modulations that operate at higher SNRs, some noise on the channel coefficients might remain uncompensated. For example, in a specific embodiment of the invention, a 3-tap smoothing filter is used at SNRs below 10 dB, and no filtering is done at SNRs higher than that. Thus the higher data rates, which typically operate at SNRs higher than the threshold of 10 dB do not get any smoothing advantage. This unfiltered noise, though small at higher SNRs has significant impact on the performance because of greater sensitivity of higher order modulations used for higher data rates. As an enhancement, the invention proposes to use Decision feedback correction technique to reduce the effect of errors for these cases.

Figure 2B:
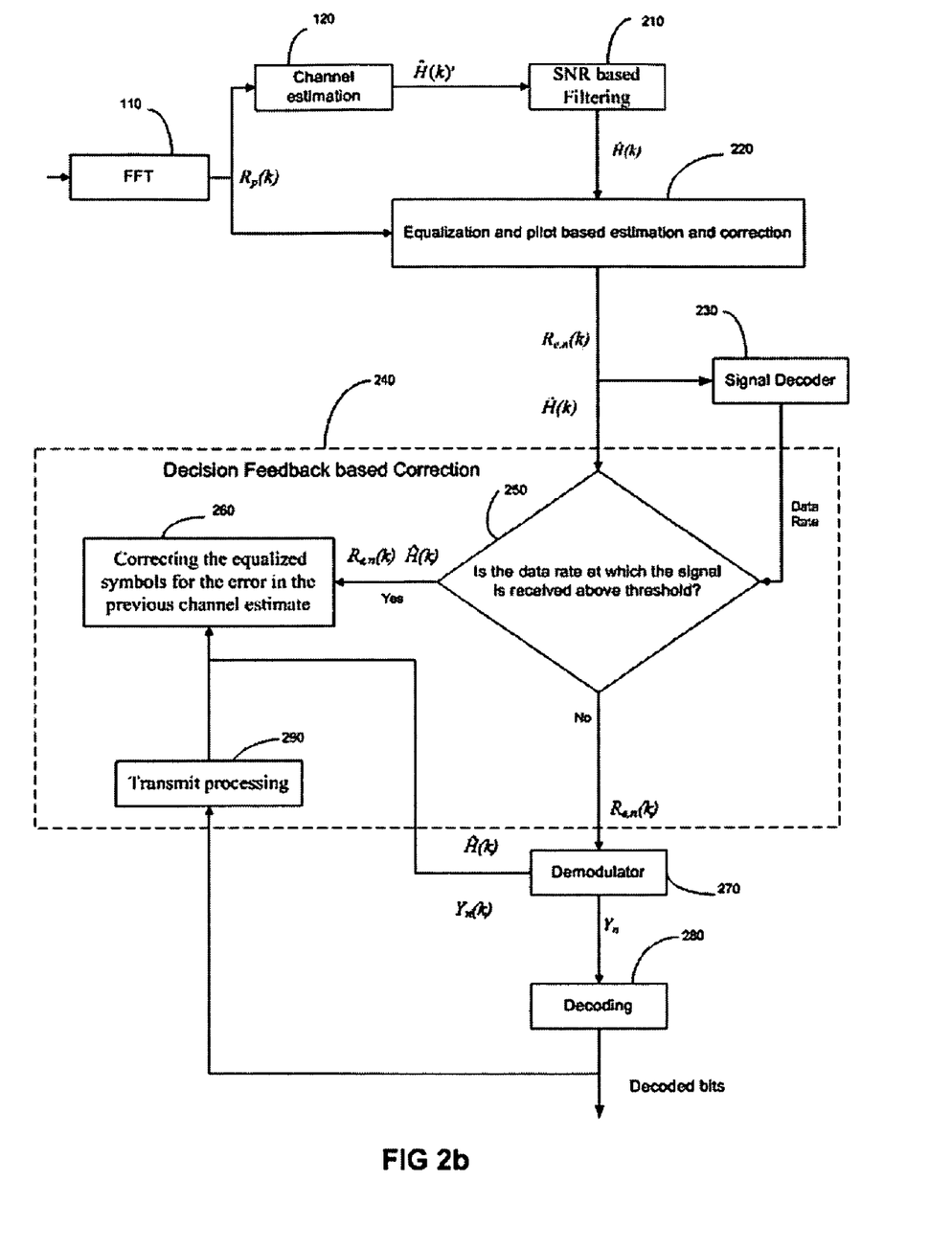

Referring to FIG. 2(b) at step 220, equalization and pilot based estimation and correction are performed on the received signal. The FIG. 2(b) sequence uses SNR based filtering in lieu of a smoothing filter. The equalization and pilot based estimation uses the outcome of SNR based filtering performed at step 130 (as also shown in FIG. 1), together with the FFT computation performed at step 110. The equalized symbols have some error component that remains uncompensated for signals of high SNR that were not smoothed due to SNR based selection. To compensate for this error, such signals are refined by performing Decision Feedback based correction at step 240 and are then fed to the demodulator/decoder to get improved estimates. At step 250, a decision is made on whether to refine the signal or not by checking the data rate of the signal. If at step 250 the data rate of the signal is above the threshold value, the signal is sent for refinement by compensating for the error in the channel estimate. An estimate of this error, $\epsilon_H(k)$ is formed by comparing the decision feedback symbols with the original equalized symbols. The refined signal is then fed back to the decoder and the steps are repeated for all the symbols till the end of the packet.

Thus the combination of SNR based selection of smoothing filter with Decision Feedback based correction proposes to improve channel estimate by removing the uncompensated noise for signals operating at higher order modulations.

Typically in wireless technology it is common to encounter channels which cause the signal strength to vary over a significant range (fading channels). The error component in such channels also varies accordingly. The above approaches of using smoothing filters as well as smoothing filter with DFE works fine for AWGN channels, but in case of fading channels, the invention further proposes to combine smoothing filter structure with the weighted channel state information (WCSI) decoding to address the equalization and decoding problems in a wide range of operating conditions that include poor SNR as well as fast fading channels. This new approach targets the component of error in the equalizer outputs $R_{e,n}(k)$ corresponding to $$\frac{W_n(k)}{\hat{H}(k)}.$$

For channels in deep fades, when $|\hat{H}(k)|$ is very small, this term can become a significant cause of errors. To prevent this, a reliability metric is associated with each of the bits being decoded. This reliability metric is based on the channel experienced by the particular bit. The bits on the sub-carriers, which are in a fade, have low reliability (as they are likely to have a large noise component) and hence they should be given less weight while decoding. The sub-carriers with a stronger signal (large $|\hat{H}(k)|$) should be given large weights.

Figure 3A:
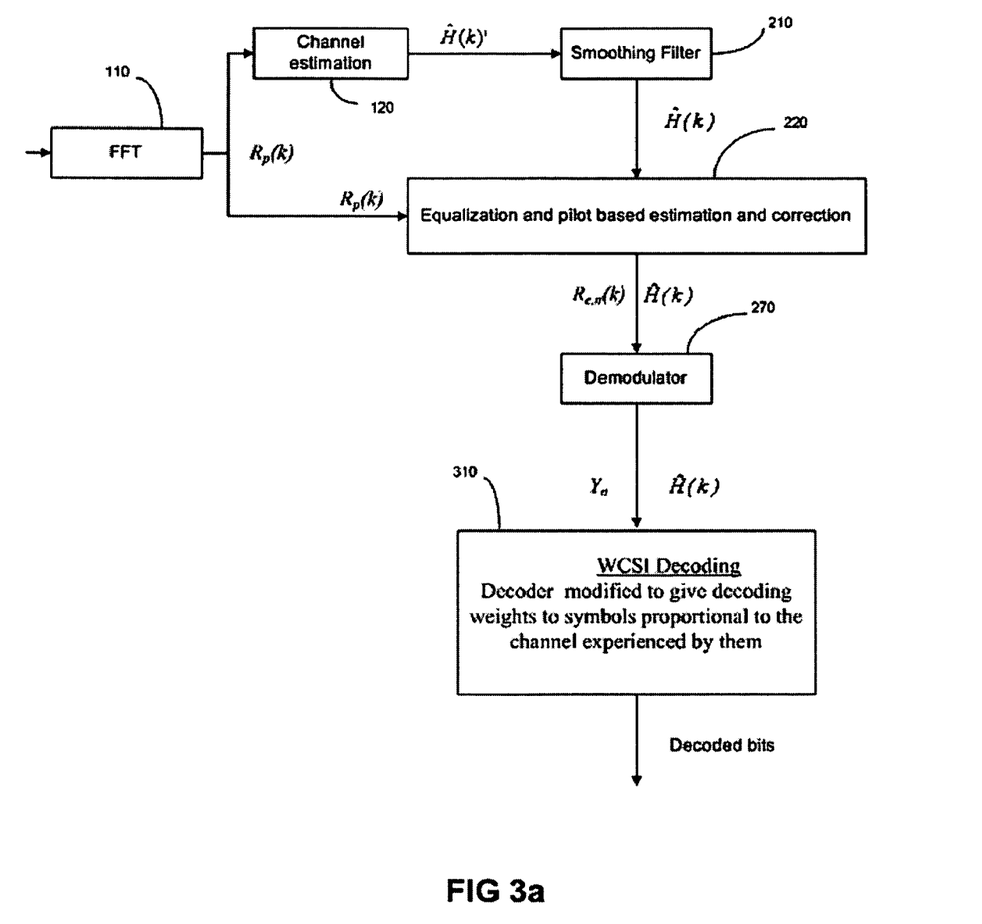

Referring to FIG. 3(a) which includes WCSI decoding, the outcome at step 110 of FFT algorithm together with the channel estimate $\hat{H}(k)'$ obtained after the application of smoothing filter at step 210, are used to perform equalization and pilot based estimation to recover the transmitted signal at step 220. The outcome of equalization and pilot based estimation that is performed at step 220 is the equalized signal $X_n(k)'$, noting that $\hat{H}_f(k)'$ is an input to the module which is passed along for further use by the DFE and decoder modules.

At step 310, WCSI decoding is performed where the transmitted signal is decoded using a weight metric and the weights assigned are proportional to the magnitude of channel estimate. In implementation, this multiplying weight can be represented in any number of bits depending on the hardware complexity vs. performance tradeoff. In a special case of WCSI, the weight representation can be limited to binary 0 or 1. This is a particularly hardware efficient technique because it completely eliminates the need for a multiplier and is known as the erasures method. All bits with channel magnitude above a chosen threshold are assigned a weight 1 and the others a weight 0. Further, at step 270, the equalized signal obtained after equalization and pilot based estimation and correction is demodulated. The decoder decodes the demodulated data using weighted decoding metric. At step 310, the decoder uses an algorithm such as the Viterbi algorithm for decoding, corrects errors in $y_n$ and gives the decoded bit stream.

Figure 3B:
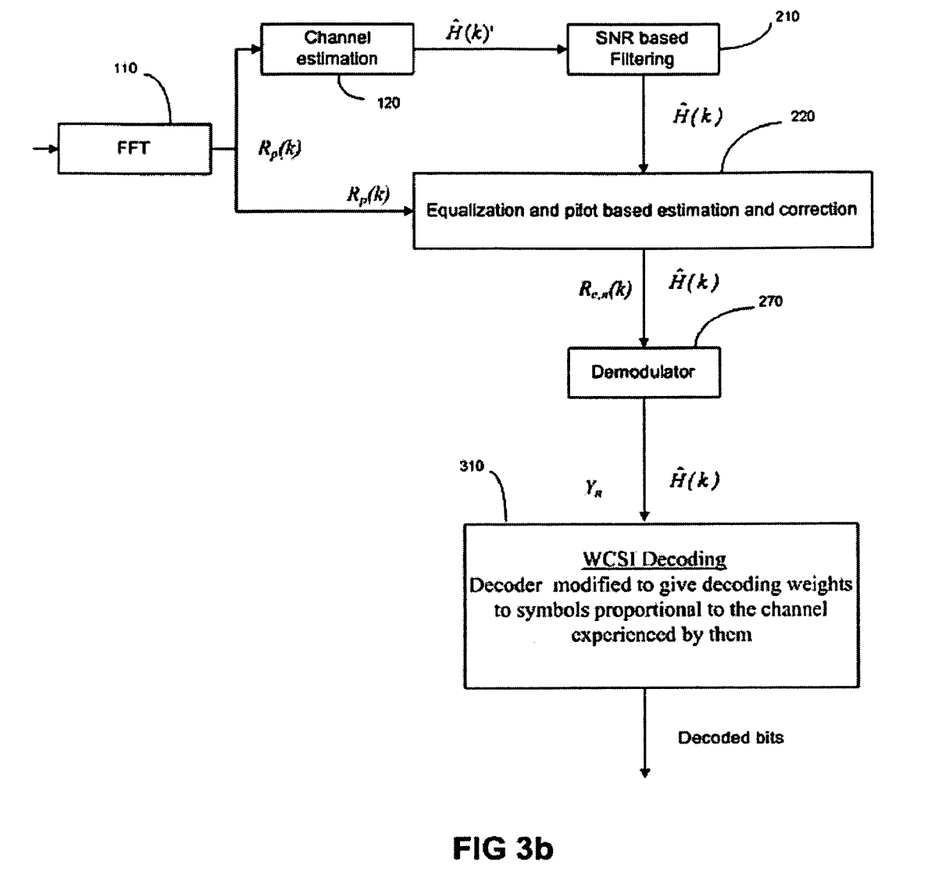
FIG. 3(b) is a flowchart illustrating the implementation of SNR based selection of smoothing filter with Weighted Channel State Information (WCSI) decoding according to an embodiment of the present subject matter.

Referring to FIG. 3 (b) which also includes WCSI, and SNR based filtering, at step 220, equalization and pilot based estimation is performed. The equalization and pilot based estimation at step 220 uses the outcome of FFT computation performed at step 110, and the channel estimate obtained after SNR based filtering performed at step 130 (also shown in FIG. 1). At step 310, WCSI decoding is performed and the received signal is decoded using a weight metric such that the assigned weights are based on the size of the channel. In implementation, this multiplying weight can be represented in any number of bits depending on the hardware complexity vs. performance tradeoff. In a special case of WCSI, the weight representation can be limited to binary 0 or 1. This is a particularly hardware efficient technique because it completely eliminates the need for a multiplier and is known as the erasures method. All bits with channel magnitude above the threshold are assigned a weight 1 and the others a weight 0.

Further, with reference to FIG. 3(b), the equalized signal obtained after equalization and pilot based estimation is decoded by decoder 310. The decoder decodes the originally transmitted signal (data) using a weighted decoding metric. The decoder or the demodulator uses an algorithm such as the Viterbi algorithm to decode the signal, and the decoder corrects errors in $y_n$ to give the transmitted bits. The weighted decoding metric calculation performed here is the same as the decoding metric except that this metric is weighted by the channel magnitude. This proposed improvement by way of a combination of SNR based filtering and WCSI decoding helps in getting accurate results in a wide range of scenarios including those for slow and fast fading channels.

The method of implementation proposed in FIG. 3(a) can be further enhanced using Decision Feedback based correction. This enhances the receiver performance for highly frequency selective fading channels where filtering due to smoothing is high.

Figure 4A:
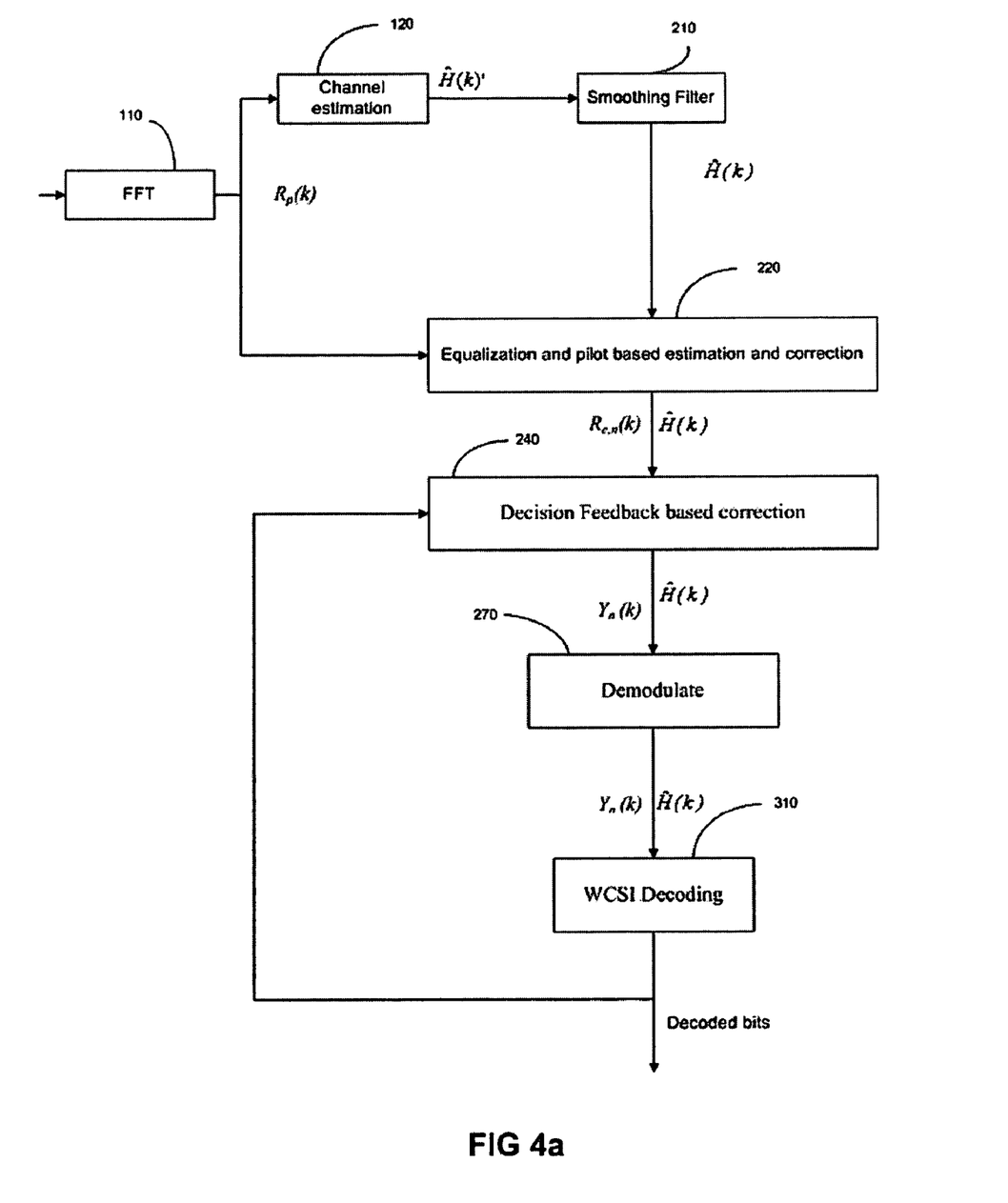
FIG. 4(a) is a flowchart illustrating the implementation of Smoothing Filter with decision feedback based correction and Weighted Channel State Information (WCSI) decoding according to an embodiment of the present subject matter; and, FIG. 4(b) is a flowchart illustrating the implementation of SNR based selection of Smoothing Filter with decision feedback based correction and Weighted Channel State Information (WCSI) decoding according to an embodiment of the present subject matter.

FIG. 4(a) illustrates a flow chart showing the implementation of a combination of the proposed improvements, which are smoothing filters with Weighted Channel State Information (WCSI) decoding as shown in FIG. 3(a), together with Decision Feedback based correction as shown in FIG. 2(a). The combination of all the proposed improvements leads to better channel estimate and increased accuracy of the systems based on these methods.

With further reference to FIG. 4(a), at step 220, equalization and pilot based estimation is performed on the received signal. The outcome at step 110, of FFT algorithm together with the channel estimate $\hat{H}(k)$ obtained after application of smoothing filter at 210 is used at step 220, to perform equalization to recover the actually transmitted signal. The outcome of equalization and pilot based estimation performed at step 220 is the equalized signal $R_{e,n}(k)$, noting that $\hat{H}(k)$ is an input to the module which is passed along for further use by the DFE and decoder modules.

At step 310 of FIG. 4(a), WCSI decoding is performed on the signal (as also shown in FIG. 3(a)), where a weighted metric is assigned based on the size of the channel. At step 310, decoding is performed on the signal to get the decoded data bits using the weighted metric assigned to the signal. The decoding metric calculation can be performed using different algorithms.

The decoded bits obtained as above can be refined further using the Decision Feedback based correction. Now at step 240, Decision feedback based correction is performed (as also shown in FIG. 2(a)), on the signal where the signal is refined by scaling it with the error component of the previous channel estimate. The decision of whether to refine the signal or not is based on the data rate of the signal. The refined signal is fed to the decoder where it is decoded and the above steps are repeated for all the symbols in the data bit of the signal. The combination of the above described improvements result in better channel estimates giving accurate signals that in turn enhances the performance of the systems based on these improvements.

Figure 4B:
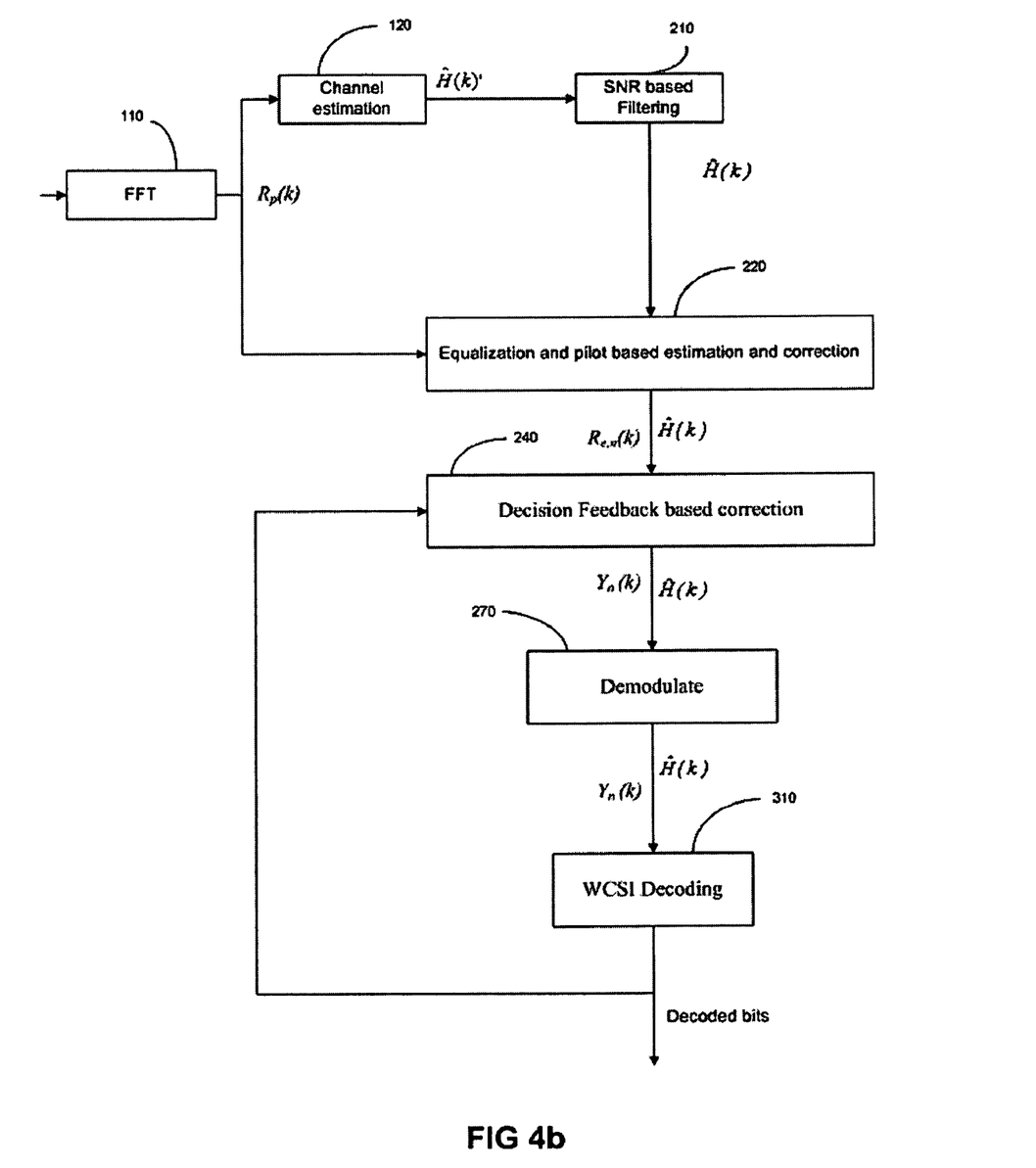

SNR based selection of smoothing filter in a modification as shown in FIG. 4(b) gives better estimates compared to the conventional technique but this channel estimate comprises few error components that were left uncompensated as a result of the decision of not to use smoothing filters for signals of higher order modulation (signals operating at high SNRs). This error (due to not smoothing at high SNR) is compensated only by DFE. WCSI compensates errors in equalization due to fading channels. The method taught herein uses a selective combination of all the proposed improvements i.e., SNR based selection of smoothing filter with Weighted Channel State Information (WCSI) decoding in combination with Decision Feedback based correction to get an accurate estimate of the transmitted data.

Referring to FIG. 4(b), the channel estimate obtained after SNR based filtering performed at 130 (as also shown in FIG. 1), is passed on for equalization. At step 220, the equalization and pilot based estimation is performed on the signal obtained as a result of FFT computation performed at step 110, and the channel estimate from SNR based filtering performed at step 130.

At step 310 of FIG. 4(b), WCSI decoding is performed (as also shown in FIG. 3(b) on the signal, where appropriate weight is assigned to the signal based on the channel size. At step 310, the decoder decodes the signal according to the weight assigned to the signal for WCSI decoding.

The decoded bits are input to DFE to calculate the error in channel estimate and correct it for subsequent data bits. In IEEE 802.11a/g applications for example, where the data rate of the decoded signal is compared with the threshold value and if the data rate of the signal is above threshold value, the signal is refined by correcting it for the error component of the previous channel estimate. This refined signal is fed to the decoder, and this process is repeated so as to get the accurate transmitted signal.

It is to be noted that FIGS. 1-4(b) are merely representational and are not drawn to scale. Certain portions thereof may be exaggerated, while others may be minimized. They illustrate various embodiments of the invention that can be understood and appropriately carried out by those of ordinary skill in the art. The combination of all the described improvements hereinabove results in better channel estimates giving an accurate signal that in turn enhances the performance of the systems based on these improvements. In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. The above-described implementation is intended to be applicable, without limitation, to situations where improvement to an OFDM system is sought, considering the use of smoothing filter, DFE and WCSI decoding. The description hereinabove is intended to be illustrative, and not restrictive. The various embodiments of the method of improving the OFDM system described herein are applicable generally to any OFDM system, and the embodiments described herein are in no way intended to limit the applicability of the invention. Many other embodiments will be apparent to those skilled in the art. The scope of this invention should therefore be determined by the appended claims as supported by the text, along with the full scope of equivalents to which such claims are entitled.

The invention claimed is:

1. A method for improving the performance of an OFDM (Orthogonal Frequency Division Multiplexing) system, comprising:
    performing channel estimation on a preamble in a received signal to obtain a first estimate;
    using a smoothing filter on this first estimate to obtain an improved channel estimate;
    performing equalization, demodulation and decoding on the received signal to obtain an estimate of transmitted signal;
    performing a decision feedback based correction on the received signal;
    assigning a weight to demodulated symbols of the received signal; and
    decoding the received signal according to the assigned weight, including weighted channel state information (WCSI) decoding performed on the received signal, where a weighted metric is assigned to said demodulated symbols.

2. The method of claim 1, wherein, said smoothing filter is chosen based on an estimated Signal to Noise Ratio (SNR).

3. A method for improving the performance of an OFDM system, comprising:
    performing channel estimation on a preamble in a received signal to obtain a first estimate;
    performing equalization, demodulation and decoding on the received signal to obtain a transmitted signal estimate;
    performing a decision feedback based correction on equalized symbols of the received signal,
    assigning a reliability weight to demodulated symbols of the received signal according a corresponding signal estimate; and
    decoding said demodulated symbols according to the assigned reliability weight, including weighted channel state information (WCSI) decoding performed on the received signal, where a weighted metric is assigned to said demodulated symbols.

4. The method of claim 3, further comprising selectively using a smoothing filter on the received signal to improve the channel estimate.

5. The method of claim 3, further comprising:
    making a decision pertaining to the use/choice of a smoothing filter to improve the channel estimate, wherein one parameter on which the decision is based is an estimated SNR.

6. A method for improving the performance of an OFDM system, comprising:
    performing channel estimation on a preamble in a received signal to obtain a first estimate;
    using a smoothing filter on this first estimate to obtain an improved channel estimate, wherein, said smoothing filter is chosen based on an estimated Signal to Noise Ratio (SNR);
    performing equalization, demodulation and decoding on the received signal to obtain an estimate of transmitted signal, including weighted channel state information (WCSI) decoding performed on the received signal, where a weighted metric is assigned to said demodulated symbols; and
    performing a decision feedback based correction on the received signal.

7. The method of claim 6, further comprising:
    assigning a weight to demodulated symbols of the received signal, and
    decoding the received signal according to the assigned weight.

8. A method for improving an OFDM system performance, comprising:
    performing channel estimation on a preamble in a received signal to obtain a first estimate;
    making a decision pertaining to selective use/choice of a smoothing filter to improve the first estimate, wherein one parameter on which said decision is based comprises an estimated SNR;
    including performing a decision feedback based correction on the received signal; and
    including weighted channel state information (WCSI) decoding performed on the received signal, where a weighted metric is assigned to demodulated symbols of a received signal.

9. The method of claim 8, further comprising:
performing equalization, demodulation and decoding on the received signal to obtain a transmitted signal estimate; and
deciding whether to perform a decision feedback based correction on the received signal to further improve the estimate, wherein the decision whether to perform decision feedback based correction is based on a comparison of a data rate of the received signal with a threshold value, in IEEE 802.11a/g applications.

10. The method of claim 8, further comprising:
assigning a reliability weight to demodulated symbols according to a corresponding channel estimate; and
decoding the demodulated symbols according to the assigned reliability weight.

11. The method of claim 8, further comprising:
performing equalization, demodulation and decoding on the received signal to obtain an estimate of the transmitted signal;
performing a decision feedback based correction on the received signal to further improve the estimate;
assigning a reliability weight to demodulated symbols according to a corresponding channel estimate; and
decoding the demodulated symbols according to the assigned reliability weight.

12. The method of claim 8, further comprising:
performing equalization, demodulation and decoding on the received signal to obtain a transmitted signal estimate;
deciding whether to perform decision feedback based correction to improve equalized symbols in the transmitted signal estimate, wherein the decision whether to perform decision feedback based correction is based on a comparison of a data rate of the received signal with a threshold value in IEEE 802.11a/g applications;
assigning a reliability weight to demodulated symbols in the received signal; and
decoding the demodulated symbols according to the assigned reliability weight.

13. An article comprising:
a storage medium having instructions that, when decoded by a computing platform, will result in a method for improving the performance of an OFDM (Orthogonal Frequency Division Multiplexing) system, comprising:
performing channel estimation on a preamble in a received signal to obtain a first estimate;
using a smoothing filter on this first estimate to obtain an improved channel estimate;
performing equalization, demodulation and decoding on the received signal to obtain an estimate of transmitted signal; and
performing a decision feedback based correction on the estimate of transmitted signal, wherein the decision feedback based correction is performed to correct the equalized symbols for an error in a previous channel estimate:
assigning a weight to demodulated symbols of the received signal; and decoding the received signal according to the assigned weight, including weighted channel state information (WCSI) decoding performed on the received signal, where a weighted metric is assigned to said demodulated symbols.

14. An article comprising:
a storage medium having instructions that, when decoded by a computing platform, will result in a method for improving the performance of an OFDM (Orthogonal Frequency Division Multiplexing) system, comprising:
performing channel estimation on a preamble in a received signal to obtain a first estimate;
making a decision pertaining to selective use/choice of a smoothing filter to improve the first estimate, wherein one parameter on which said decision is based comprises an estimated SNR;
including performing a decision feedback based correction on the received signal; and
including weighted channel state information (WCSI) decoding performed on the received signal, where a weighted metric is assigned to demodulated symbols of a received signal.

15. An article comprising:
a storage medium having instructions that, when decoded by a computing platform, will result in a method for improving the performance of an OFDM (Orthogonal Frequency Division Multiplexing) system, comprising:
performing channel estimation on a preamble in a received signal to obtain a channel estimate;
using a smoothing filter on the received signal to improve the channel estimate, wherein the smoothing filter is chosen based on the estimated SNR; and
performing equalization, demodulation and decoding on the received signal to obtain an estimate of transmitted signal, including weighted channel state information (WCSI) decoding performed on the received signal, where a weighted metric is assigned to said demodulated symbols; and
performing a decision feedback based correction on the received signal.

* * * * *